(12) United States Patent
Barrett et al.

(10) Patent No.: US 9,088,951 B2
(45) Date of Patent: Jul. 21, 2015

(54) DYNAMIC FEATURE-AWARE POWER MANAGEMENT

(75) Inventors: Michael Barrett, Cardiff by the Sea, CA (US); Jangwon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 700 days.

(21) Appl. No.: 13/252,077

(22) Filed: Oct. 3, 2011

(65) Prior Publication Data
US 2012/0303171 A1 Nov. 29, 2012

Related U.S. Application Data

(60) Provisional application No. 61/489,957, filed on May 25, 2011.

(51) Int. Cl.
*G05D 3/12* (2006.01)
*H04W 52/02* (2009.01)

(52) U.S. Cl.
CPC ...... *H04W 52/0264* (2013.01); *H04W 52/0277* (2013.01); *Y02B 60/50* (2013.01)

(58) Field of Classification Search
CPC .................. H04W 52/0258; H04W 52/0261; H04W 52/0277; G06F 1/3203; G06F 1/32; G06F 1/3296; G06F 1/3212; G06F 1/324; G06F 9/5094; G06F 11/3062; G06F 1/3234; G06F 1/329
USPC .......................................................... 700/295
See application file for complete search history.

(56) References Cited

U.S. PATENT DOCUMENTS

| 7,460,064 | B1 | 12/2008 | Tester et al. |
| 7,522,941 | B2 * | 4/2009 | Lu .................................. 455/574 |
| 7,583,951 | B2 | 9/2009 | Gibbs |

(Continued)

FOREIGN PATENT DOCUMENTS

| JP | H09181804 A | 7/1997 |
| JP | 2004233150 A | 8/2004 |

(Continued)

OTHER PUBLICATIONS

International Search Report and Written Opinion—PCT/US2012/039192—ISA/EPO—Aug. 28, 2012.

*Primary Examiner* — Robert Fennema
*Assistant Examiner* — Sivalingam Sivanesan
(74) *Attorney, Agent, or Firm* — Jeffrey D. Jacobs

(57) ABSTRACT

This disclosure relates to reducing battery usage in handheld communication devices due to operation of variable managed features, such as a location determination feature and other features that consume variable amounts of time and power. The techniques of this disclosure include dynamically managing a power budget allocated to one or more variable managed features of the handheld communication device based on power consumption over time by the variable managed features. More specifically, the techniques include, for each variable managed feature, recalculating a frequency for performing power events based on an amount of remaining power after one or more power events. The techniques also include reallocating the power budget to the one or more variable managed features based on an amount of remaining power after one or more power events of the variable managed features, a pre-determined period of time, or reaching a threshold level of power consumption jitter.

32 Claims, 5 Drawing Sheets

(56) References Cited

U.S. PATENT DOCUMENTS

| | | |
|---|---|---|
| 2004/0204181 A1* | 10/2004 | Cromer et al. ............... 455/574 |
| 2005/0258806 A1* | 11/2005 | Janik et al. .................. 320/155 |
| 2009/0289601 A1* | 11/2009 | Kanade et al. ............... 320/135 |
| 2010/0105449 A1* | 4/2010 | Shi et al. ..................... 455/574 |
| 2010/0194632 A1 | 8/2010 | Raento et al. |
| 2011/0039606 A1 | 2/2011 | Kim |
| 2011/0070896 A1 | 3/2011 | Persico |

FOREIGN PATENT DOCUMENTS

| | | |
|---|---|---|
| JP | 2008270949 A | 11/2008 |
| JP | 2010092483 A | 4/2010 |
| JP | 2010171477 A | 8/2010 |
| JP | 2011017631 A | 1/2011 |
| KR | 100723690 B1 | 5/2007 |
| KR | 20090012788 A | 2/2009 |

* cited by examiner

US 9,088,951 B2

DYNAMIC FEATURE-AWARE POWER MANAGEMENT

This application claims the benefit of U.S. Provisional Application No. 61/489,957, filed May 25, 2011, which is hereby incorporated by reference in its entirety.

TECHNICAL FIELD

The disclosure relates to power management in a handheld communication device.

BACKGROUND

Handheld communication devices, such as mobile telephones, mobile emergency communication devices, mobile global positioning system (GPS) devices, portable computers with wireless communication cards, personal digital assistants (PDAs), portable media players, or other flash memory devices with wireless communication capabilities, are typically powered by limited battery resources. Improved battery life and battery life conservation are, therefore, of paramount concern when designing handheld communication devices. The concern for battery life is offset, however, by demands for increased features and applications on handheld communication devices. Typically, performance frequency and/or duration of features of the handheld communication device are related to power consumption. Limitations on power budgets allocated to the features of the device may have an effect on the accuracy and/or quality of performance of these features.

SUMMARY

In general, this disclosure relates to techniques for reducing battery usage in handheld communication devices due to operation of variable managed features, such as a global positioning system (GPS) based location determination feature and other features that consume a variable amount of time and power. The variable managed features of the handheld communication device allow for a tradeoff between feature performance and power usage. The techniques of this disclosure include dynamically managing a power budget allocated to one or more variable managed features of the handheld communication device based on power consumption over time by the variable managed features. More specifically, the techniques include, for each variable managed feature, recalculating a frequency for performing power events based on an amount of remaining power for the variable managed feature after one or more power events. In addition, the techniques may include reallocating the power budget to the one or more variable managed features based on an amount of remaining power after one or more power events of the variable managed features, a pre-determined period of time, or reaching a threshold level of power consumption jitter.

As an example, after each GPS based location determination, i.e., "fix," a handheld communication device may recalculate when to perform a subsequent fix based on an amount of power remaining in the budget allocated to the GPS-based location determination feature. The frequency with which the handheld communication device performs each fix may be varied because the amount of time, and therefore power, necessary to return each fix may vary based on satellite coverage or other environmental influences. In this way, the techniques may enable the handheld communication device to balance the frequency of a GPS fix with the battery life of the device.

In one example, the disclosure is directed to a method of managing power consumption in a battery-powered device comprising determining an amount of power allocated to a variable managed feature supported by the device, performing power events of the variable managed feature, wherein performing each of the power events consumes a variable amount of power, and recalculating a frequency with which to perform the power events of the variable managed feature based on an amount of remaining power for the variable managed feature after one or more of the power events.

In another example, the disclosure is directed to a battery-powered device comprising means for determining an amount of power allocated to a variable managed feature supported by the device, means for performing power events of the variable managed feature, wherein performing each of the power events consumes a variable amount of power, and means for recalculating a frequency with which to perform the power events of the variable managed feature based on an amount of remaining power for the variable managed feature after one or more of the power events.

In another example, the disclosure is directed to a computer-readable medium in a battery-powered device containing instructions. The instructions cause a programmable processor to determine an amount of power allocated to a variable managed feature supported by the device, perform power events of the variable managed feature, wherein performing each of the power events consumes a variable amount of power, and recalculate a frequency with which to perform the power events of the variable managed feature based on an amount of remaining power for the variable managed feature after one or more of the power events.

In another example, the disclosure is directed to a battery-powered device comprising a processor to determine an amount of power allocated to a variable managed feature supported by the device, perform power events of the variable managed feature, wherein performing each of the power events consumes a variable amount of power, and recalculate a frequency with which to perform the power events of the variable managed feature based on an amount of remaining power for the variable managed feature after one or more of the power events.

The details of one or more examples are set forth in the accompanying drawings and the description below. Other features, objects, and advantages will be apparent from the description and drawings, and from the claims.

DETAILED DESCRIPTION

Figure 1:
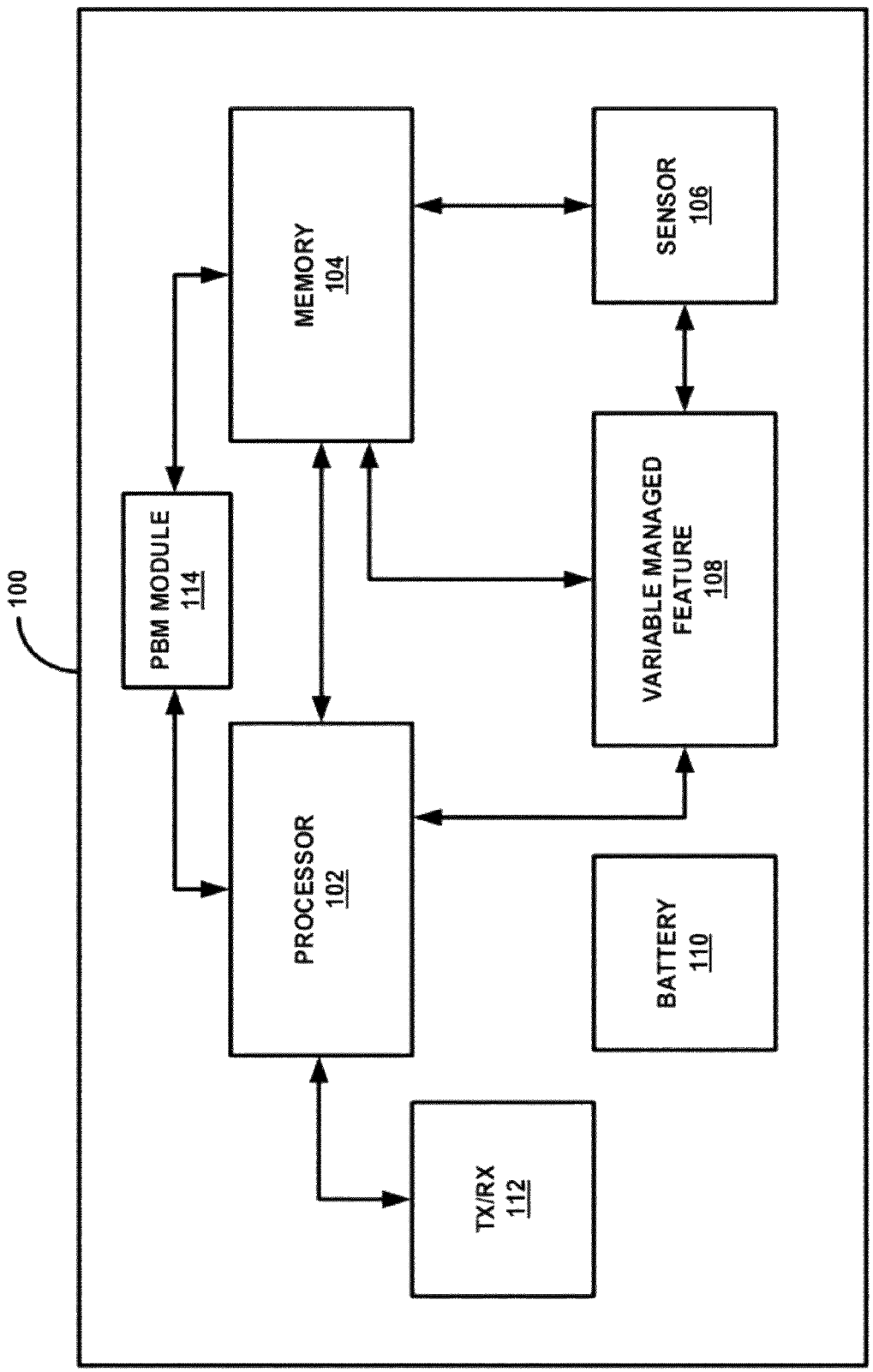
FIG. 1 is a block diagram illustrating an example handheld communication device that utilizes the techniques of this disclosure.

In general, this disclosure relates to managing battery usage in a handheld communication device due to operation of features that use variable amounts of time and power. These features may be defined as variable managed features. Some examples of the variable managed features may be global positioning system (GPS) based location determination, other sensor-based features, and data transfer over a communication link. The variable managed features allow for a tradeoff between feature performance and power usage.

In the example of battery-powered devices, it is generally important to conserve power and prolong the battery life as long as possible. The performance of features is often related to power consumption, and optimizing the performance of some features may be subject to limitations on the power budget, especially in smaller devices that require smaller batteries. There is often a correlation between feature performance and battery life. The techniques of this disclosure provide an algorithm that optimizes the feature performance subject to limitations on the power budget.

As an example, mobile emergency communication devices may be designed with a small form factor, and require a small battery, in order to be worn on a user's clothing or wrist. At the same time, mobile emergency communication devices may require maintaining enough power to perform an emergency call, which may include two-way communication or at least communication of the user's location. Mobile emergency communication devices, therefore, allocate a comparatively small power budget to continually perform a GPS-based location determination, i.e., "fix," to ensure the user's location is accurately obtained in case of an emergency. The continual performance of the location determination may consume a substantial amount of power, especially in areas with poor satellite coverage. Reducing the frequency of performing the GPS-based location determination, however, may negate the purpose of the mobile emergency communication device to provide accurate location information for the user.

The techniques of this disclosure may include dynamically managing a power budget allocated to one or more variable managed features of the handheld communication device based on power consumption over time by the variable managed features. More specifically, the techniques include, for each variable managed feature, recalculating a frequency for performing power events based on an amount of remaining power for the variable managed feature after one or more power events. The techniques may also include reallocating the power budget to the one or more variable managed features based on an amount of remaining power after one or more power events of the variable managed features, a predetermined period of time, or reaching a threshold level of power consumption jitter.

In this disclosure, the example of a location determination feature is used to discuss the techniques of the disclosure. It should be understood that these techniques are likewise applicable to other variable managed features that have associated power requirements and allow for a tradeoff between feature performance and power consumption. The location determination feature, e.g., one that may utilize GPS or other sensors, may be defined as a variable managed feature, because it allows for tradeoff between performance and power usage, and utilizes a variable amount of power each time it makes a location determination. For example, the less frequently a variable managed feature is used, the less power consumed by the operation of that feature, and the shorter time the variable managed feature operates in performing a power event, the less power consumed.

FIG. 1 is a block diagram illustrating an example handheld communication device 100 that utilizes the techniques of this disclosure. Device 100 may include processor 102, memory 104, sensor 106, variable managed feature 108, battery 110, and transceiver 112. Variable managed feature 108 may include one or more features whose performance may be managed by techniques of this disclosure to reduce its power consumption. In one example, variable managed feature 108 may be a sensor-based feature, for example, such as a GPS-based location determination feature. It should be understood that device 100 may include other components, which may depend on the type of device or other functionalities associated with the device. The components shown in FIG. 1 are merely illustrative. In one example, device 100 may be a communication device, such as a mobile emergency communication device, and may include transceiver 112 and other components associated with the communication functionality. Device 100 may utilize transceiver 112 to communicate with an emergency response system (e.g., 911) or an emergency contact number (e.g., a relative or caretaker of the person carrying device 100) by placing a call or sending location information. Transceiver 112 may transmit and receive communications via a network, e.g., a cellular network.

Processor 102 may be operable to execute one or more algorithms that include, for example, a dynamic feature-aware power budget management algorithm that optimizes power consumption associated with variable managed features. In one example, a power budget management (PBM) module 114 may oversee the operation and execution of the dynamic power budget management algorithm. Processor 102 may also process data collected by sensor 106 and used by variable managed feature 108. Additionally, processor 102 may make determinations regarding power budgets associated with battery 110 and power usage from the operation of variable managed feature 108, according to the techniques described in this disclosure.

Memory 104 may include one or more computer-readable storage media. Memory 104 may comprise one or more storage devices, capable of long-term and short-term storage of information. Short-term storage of memory 104 may also be described as a volatile memory. Examples of volatile memories include random access memories (RAM), dynamic random access memories (DRAM), static random access memories (SRAM), and other forms of volatile memories known in the art. Long-term storage of memory 104 may also be described as non-volatile memory. Examples of such non-volatile storage elements may include magnetic hard discs, optical discs, floppy discs, flash memories, or forms of electrically programmable memories (EPROM) or electrically erasable and programmable (EEPROM) memories.

In one example, memory 104 may be used to store program instructions for execution by processor 102 such as, for example, dynamic feature-aware power budget management algorithms associated with feature 108. Memory 104 may be also used by software or applications running on device 100 (e.g., sensor 106 and feature 108) to temporarily store information during program execution or during operation.

Sensor 106 may be one or more sensors that can collect data based on sensed data. For example, sensor 106 may be GPS or another location determination capability. Variable managed feature 108 may include one or more features that utilize data collected by sensor 106 to perform one or more operations associated with device 100. In one example, feature 108 may be a GPS-based location determination feature that utilizes location information from a GPS-based sensor (e.g., sensor 106) in its operation.

Variable managed feature 108 may be an application executed by processor 102 that utilizes input from sensor 106. In one example, overall power consumption by device 100 may increase each time variable managed feature 108 is used, i.e., when input from sensor 106 is requested and processed. The power consumption of device 100, therefore, may be affected according to the frequency of use of variable managed feature 108 and/or the duration of use of variable managed feature 108. As noted above, while the example of a GPS-based location determination features will be used throughout this disclosure, it should be understood that the techniques of this disclosure are applicable to other features, which may be classified as variable managed features and utilize sensors or inputs that increase overall power consumption by device 100. Furthermore, techniques of this disclosure are applicable to other types of sensors and resources, which allow for tradeoffs between power usage and resource duration and/or performance.

In one example, management of the use of sensor 106 (e.g., GPS) and other hardware associated with the operation of sensor 106 becomes an important factor in power budget management of the power source associated with device 100, e.g., battery 110. In some examples, running sensor 106 may consume a relatively large amount of power available from battery 110. One conventional method of power budget management may be performed by programming the location determination to operate in either a high-power primary mode or a low-power fallback or secondary mode with associated timeouts to switch between the modes. The techniques of this disclosure provide dynamic feature-aware power budget management that may further improve power budget management of battery 110.

In the example where sensor 106 is a location determination sensor, fixes (e.g., events during which a location is determined) take variable amounts of time, and therefore, consume variable amounts of power. The amount of time needed for a fix may depend on various factors such as, for example, the GPS coverage which may depend on satellite signal strength and the number of satellites within view or range. For example, the time to fix can vary by more than an order of magnitude between very poor and very good satellite coverage. In some cases, the GPS may time out while attempting to fix if the satellite coverage is insufficient. In some example, device 100 may integrate other location determination capabilities with the primary method (e.g., GPS) such that a fix is always returned.

In a GPS-based location determination feature, there is a tradeoff between the desire to determine location frequently and the desire to limit battery consumption. For example, the more frequently a location fix is attempted and the longer the amount of time needed to achieve the location fix, the more power is consumed from battery 110 by variable managed feature 108. In general, there is a correlation between how frequently location is determined and battery life. Specifically, there is a direct relationship between how often and how long the location determination engine runs and the battery life. As noted above, other types of variable managed features may include other types of sensors or any functionalities, for which the associated power consumption may vary based on changes to operation. For example, data transfer over a communication link may have a tradeoff between the amount of data compression and therefore accuracy of the data and the amount of power consumed in transferring the data. Techniques of this disclosure provide an algorithm that manages the tradeoff between the operation of variable managed feature 108 and the battery life of battery 110. The techniques provide dynamic feature-aware power budget management that is sensitive to the duration of the location determination.

Figure 2B:
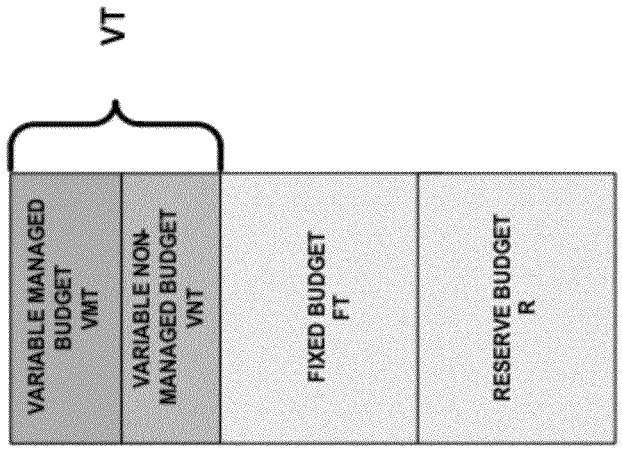
FIG. 2B illustrates example power budget categories corresponding to a partially charged battery.
Figure 2A:
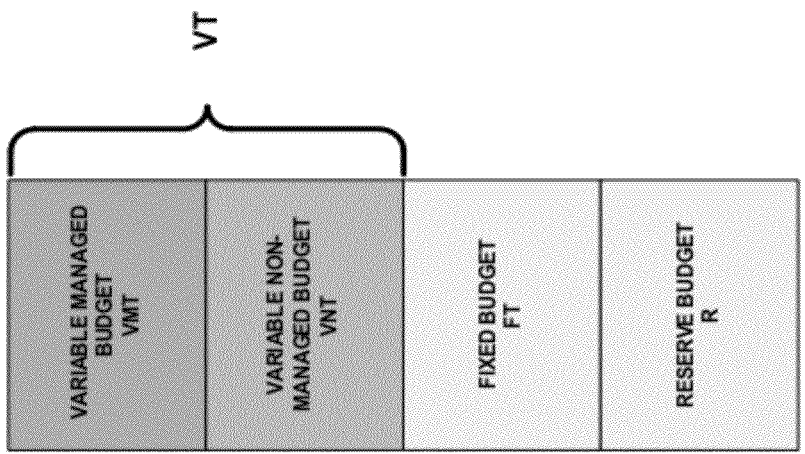
FIG. 2A illustrates example power budget categories corresponding to a fully charged battery.

FIGS. 2A and 2B illustrate example power budget categories corresponding to a fully charged battery and a partially charged battery, respectively, for a handheld communication device. Battery capacity of a device battery (e.g., battery 110 of FIG. 1) may be divided into four power budget categories: reserve, fixed, variable non-managed, and variable managed.

The reserve budget R may be a fixed amount of the battery capacity that may be reserved for essential functions when the device is operating between charges. For example, the reserve budget R may guarantee that a voice call or a text message may be performed in case of an emergency during a given inter-charge time. When the device comprises a mobile emergency communication device, for example, the reserve budget for such essential functions may be larger than in a mobile telephone or other handheld devices. For example, a mobile emergency communication device may use the reserve budget to transmit GPS-based location information, perform a two-way voice call of at least 20 minutes, transmit multiple text messages, transmit photographs or video, and the like.

The fixed budget Ft may be a fixed amount of battery capacity used to run constantly-required activities for operation of the device, such as running a processor or other peripheral components of the device. For example, the fixed budget may comprise a fixed utilization rate of battery capacity, e.g., 1 mA per hour.

The variable capacity Vt is a variable amount of battery capacity available to run activities that have variable power utilization rates. Activities with variable power utilization rates may be divided into two categories: activities that may be managed for power control purposes or variable managed budget activities (VMt), and activities which may not be managed for power control purposes or variable non-managed budget activities (VNt). For example, some user or system requests for the device to perform certain activities, such as turn on, update a display, or play messages, may need to occur when requested and are considered non-managed activities. In the example of non-managed activities, there may be little to no flexibility in the duration and/or the frequency of power events associated with the requested non-managed activity.

As another example, some user or system requests may have the flexibility to be managed in terms of their frequency (e.g., how often they occur) and duration (e.g., the length of time associated with each occurrence), and therefore are considered managed activities. As an example of managed activities, a GPS-based location determination feature may allow for power budget management based on frequency and duration of location fixes performed by the feature. As another example, other system functions such as data transfers over wireless communication links may also provide some flexibility in terms of frequency, duration, and level of data compression.

FIGS. 2A and 2B illustrate the difference in power budget categories for a fully charged battery (FIG. 2A) and a partially-depleted battery (FIG. 2B). The fixed and reserve budgets may not change, because these budgets may be set aside independently of the expected battery life and are associated with fixed amounts regardless of the other functionalities of the device. The techniques of this disclosure do not affect the fixed and reserve budgets of battery power, and therefore, in the example of FIGS. 2A and 2B, the actual portions of the fixed and reserve budgets that have been utilized are not shown.

As FIG. 2B illustrates, the variable power budgets get smaller over time, and each of the variable managed and variable non-managed budgets may shrink to reach zero at the end of the expected battery life. The most efficient usage of the variable power budgets is exemplified by meeting the expected battery life without running out of variable power budget before the end of the expected battery life, or having remaining variable power budget at the end of the expected battery life. Techniques of this disclosure may allow management of the variable power budgets such that the variable budgets reach zero at the end of the expected battery life.

In one example, the battery life requirement, B, may be the length of time (e.g., in seconds) between the battery being fully charged and the battery requiring recharge. The remaining battery life, $BRt=(B-t)$, where t is the time in seconds since the last battery recharge was completed. In one example, the techniques of this disclosure may provide a method to optimize usage associated with a variable managed feature, e.g., a GPS-based location determination feature, while meeting other power budget requirements and the overall battery life requirement, as will be explained in more detail below.

As noted above, the variable budget may be divided into two portions, the variable managed budget, VMt, and the variable non-managed budget, VNt. VNt may be estimated because the actual power budget needed may not be fully known in advance, and may depend on such things as, for example, requests to change the display or turning the power on and/or off. As the battery life requirement goes from fully charged to fully depleted, the VNt estimate may be periodically updated, e.g., to a constant percentage value of Vt. As VNt is updated, VMt may be also calculated, where $VMt=Vt-VNt$. In this manner, in cases where VNt may be initially overestimated, overestimates to VNt may be reassigned to VMt, instead of remaining unused while VMt is gets depleted. Similarly, in cases where VNt may be underestimated, some of the VMt budget may be reassigned to VNt.

Figure 3B:
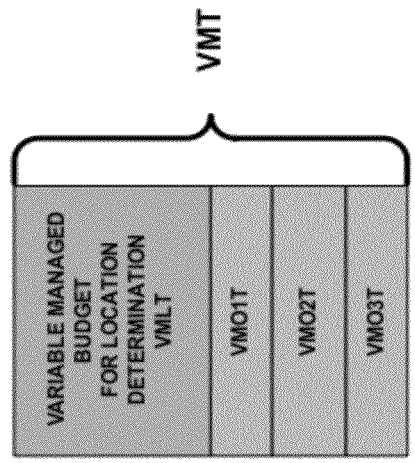
FIGS. 3A and 3B illustrate example power budget classifications for variable managed budgets of a battery.
Figure 3A:
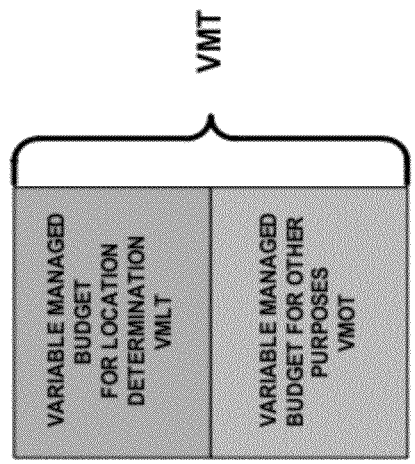

FIGS. 3A and 3B illustrate example power budget classifications for variable managed budgets (VMt) of a battery in a handheld communication device (e.g., device 100 of FIG. 1). In one example, VMt may be divided into two portions, as shown in FIG. 3A: variable managed budget for a primary feature (e.g., a location determination feature), VMLt, and variable managed budget for other variable managed features, VMOt. Therefore, $VMt=VMLt+VMOt$. As FIG. 3B illustrates, VMOt may be further divided according to multiple variable managed features, $VMO1t, VMO2t \ldots$, and VMOnt, each representing a sub-budget. VMLt and VMOt may compete for the same budget, VMt. Algorithms may be implemented to arbitrate the sharing of the VMt budget between VMLt and VMOt.

In one example, the arbitrating algorithm may be implemented to allocate budgets initially to the different features. The arbitrating algorithm may also reallocate the budgets when needed, e.g., periodically, after each activity by one of the features that may affect the budgets, or after reaching a power consumption jitter threshold. In one example, the arbitrating algorithm may allocate the budgets according to a simple configuration, e.g., VMLt receives 50% and each of VMO1t and VMO2t gets 25%. The percentages may correspond to the power budget, total power requests by the features, or total time of activity of the features. In another example, the arbitrating algorithm may employ another method to allocate the budgets, e.g., a greedy algorithm.

One example of a greedy algorithm, which may be used with the techniques of this disclosure, may allocate the power budget to a requesting feature, instead of having separate budgets with fixed percentages for each of the features. This may result in power starvation if one features uses up the full allocation. As a result, precautionary measures may be implemented to prevent one feature from utilizing the entire budget. The algorithm may be modified to allow allocation of the power budget to a requesting feature by dynamically shrinking the allocation to the requesting (or greedy) feature once that feature has consumed an amount of power that is above a certain amount of the overall allocation when other features are contending for the same power budget. In this manner, the greedy feature may be controlled during contention for the power budget by multiple entities, and allowed to acquire more resources when there is less or no contention for the power resources. It should be noted that this is one example of a greedy algorithm or an algorithm that arbitrates power budget resources. Other algorithms may be utilized to allocate and reallocate power budgets among the features as appropriate for the associated device.

In one example, techniques of this disclosure may provide algorithms for dynamically balancing performance of variable managed features within device 100 against the battery life requirements of battery 110. As noted above, a location determination feature is used herein as an illustrative example, but the same principles and techniques may be applied to other features that utilize variable managed budgets, e.g., data transfer over a communication link. In some examples, the algorithms may be applied to features which use relatively large amounts of power. The algorithm may provide dynamic feature-aware power budget management and efficiently spread the power budget over the expected remaining battery life. The power budget management algorithm may be applied in a similar manner to one or more variable managed features. In an example, where the algorithm may be applied to multiple features, the algorithm may prioritize the features. Where the algorithm is applied using prioritization techniques, after applying the algorithm, the prioritization may be reassessed among the different features. In one example, the power budgets may be divided into sub-budgets according to multiple features and the algorithm may be applied to each of the sub-budgets and the associated features. In this manner, the algorithm may allocate amounts of power to each of the variable managed features, where the amount of allocated power may be based on prioritization associated with the features, e.g., a more important feature may get more power than features considered less important. The algorithm may then manage operational frequency of each of the features based on the currently-allocated amount of power, thus determining the frequency of power events associated with each of the features. The algorithm may also reallocate amounts of power to each of the features based on prioritization and the amount of power remaining, which may be affected by performing power events associated with the features.

Figure 4A:
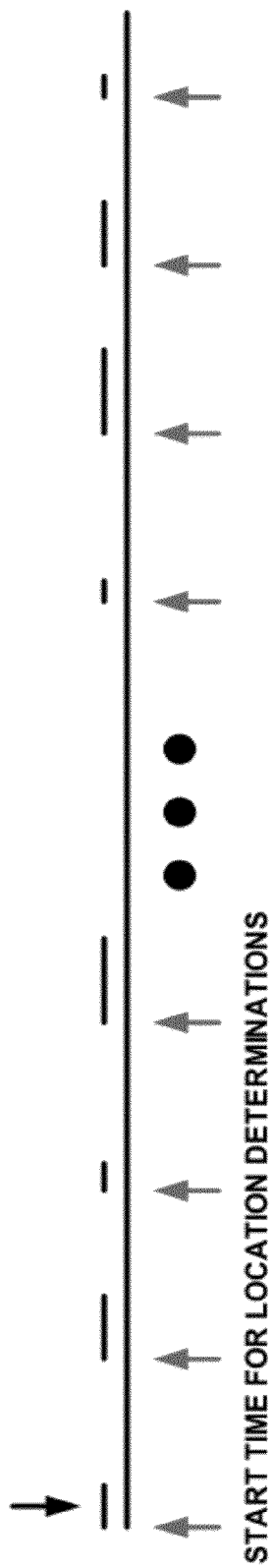
FIG. 4A illustrates an example fix distribution when no power budget management algorithm is utilized.

FIG. 4A illustrates an example fix distribution for a location-determination feature when no power budget management algorithm is utilized. In this example, the start times for location determination may be evenly distributed over the projected battery life. In the example of a GPS-based location determination feature, a power event may correspond to a fix or location determination event where the GPS module obtains data regarding the location of the device. In the example of a mobile emergency communication device, the location determination may be performed continually and transmitted in an emergency in order to locate the person wearing the device when the emergency occurs.

The location may be determined at certain intervals, and may last for an amount of time that depends on the satellite signal strength. The amount of power consumed during a power event or a fix, e.g., a location determination event, may depend on the amount of time it takes to obtain location data. In determining when to take the next fix for the location determination feature, non-linear or linear distributions may be utilized to determine fix times. In one example, using linear distributions may more evenly distribute the power budget over time, allow for a more constant performance of the associated feature, and, as a result, provide a relatively even feature performance over time. The algorithms used to implement the techniques of this disclosure are discussed using a linear distribution approach, though a non-linear distribution approach may also be used.

In the example of a location determination feature, during location determination each fix result may correspond to a power event. A feature power event may be an event associated with a feature that affects the power budget by consuming battery power. Each fix may consume a different amount of power due to factors like satellite coverage and fix duration, for example. In one example, the fix events may be distributed evenly over the projected battery life to guarantee compliance. In one example, worst case power consumption may be utilized for each fix to determine the distribution. Worst case power consumption may be based on historical or experimental data associated with the location determination functionality, e.g., the GPS engine. As a result, by the time the projected battery life is complete, it is likely that some power budget may remain unutilized.

The techniques of this disclosure may further improve feature performance by accounting for power budget that may remain unutilized. The following discussion assumes a single power event type per feature (e.g., location determination for a location determination feature) for illustrative purposes. In other cases, however, multiple power events may be performed for each variable managed feature. In those cases, the same principles and techniques may be scaled for multiple events and/or multiple features.

As discussed above, FIG. 4A illustrates that the duration for each location determination varies depending on factors, e.g., strength of satellite signal, number of satellites in range, and other environmental conditions. The distribution may be based on the worst case power consumption, e.g., the fixes that require the longest time to complete indicated by the longer dashes. In this way, the handheld communication device may ensure that each location fix will be complete before initiating a subsequent location fix. As noted above, because not all fixes require the same amount of time, e.g., some require a short amount of time as indicated by shorter dashes, some of the power budget may remain unutilized because the shorter fixes utilize less of the power budget. Therefore, feature performance may be improved by applying the dynamic feature-aware power budget management algorithm to the remaining power budget that takes into account frequency and duration of the power events.

In one example, the dynamic power budget management algorithm may utilize a value representing the power budget per event (e.g., fix). The power budget per event may be based on several factors such as, for example, worst case power consumption per power event, average case power consumption per power event, and best case power consumption per power event. The worst, average, and best case power consumption per power event values may be derived from historical data (e.g., using actual samples from the device in which the algorithm is implemented), may be estimated, or may be a filtered number (e.g., based on the last hour of operation).

The dynamic power budget management algorithm may utilize one or more of the values associated with power consumption per power event to determine the distribution frequency of the events, e.g., the difference between start times for location determinations. In accordance with the technique, the distribution frequency may be updated over time, and may therefore adapt regardless of which of the values, i.e., worst, average, or best case, the algorithm uses. In one example, average power consumption per power event may be utilized to determine the initial event distribution frequency. Using the average power consumption per power event may be based on the desire to achieve a constant level of feature performance. Additionally, while the distribution frequency adapts over time regardless of the value of power consumption per power event used (i.e., best, worst, or average), using the average case power consumption per power event may result in the least amount of frequency jitter, and may therefore be a more desirable approach.

The dynamic power budget management algorithm may also utilize other parameters. For example, one parameter may define when the fix distribution frequency should be recalculated, e.g., based on a timer, based on occurrence of one or more power events, and the like. In one example, a single power event may be utilized to trigger recalculation of fix distribution frequency. In another example, multiple events may be utilized to trigger recalculation of fix distribution frequency. In another example, the algorithm may utilize a hybrid approach in which initially multiple power events may trigger the recalculation, but, as the power budget nears exhaustion or completion, fewer power events and/or a single power event may trigger the recalculation. In another example, power consumption jitter may be determined for a sequence of events and compared to a threshold level of power consumption jitter, and based on the comparison the algorithm may be modified. For example, if the amount of power consumption jitter exceeds the threshold, i.e., plotting the values associated with power consumption exhibit jittery behavior, the algorithm may be modified to minimize the jitter. For example, for a given variable managed feature, jitter may be minimized by recalculating the frequency of fixes less frequently, and/or using the average case approach for the initial performance frequency adapted according to the algorithm. In one example, when the jitter exceeds the threshold, reallocation of the power budget may be triggered, where the algorithm may reallocate the remaining power supply among all the variable managed features according to their prioritization, as discussed above.

Figure 4B:
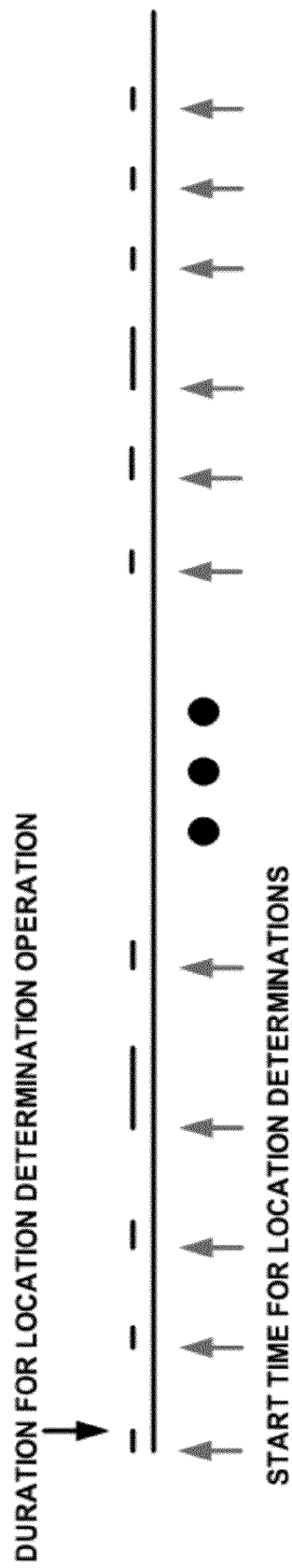
FIG. 4B illustrates an example fix distribution when a dynamic, feature-aware power budget management algorithm is utilized.

FIG. 4B illustrates an example fix distribution for a location determination feature when the dynamic feature-aware power budget management algorithm is utilized. As FIG. 4B shows, when the duration of the location determination is short, as illustrated by short dashes, the algorithm increases the frequency of the location determination, i.e., location determination occurs more frequently. Likewise, when the duration of the location determination is long, as illustrated by long dashes, the algorithm decreases the frequency of the location determination, i.e., location determination occurs less frequently, because long location determinations consume more power than the shorter ones. Using the dynamic power budget management algorithm, the device may perform more location determinations while staying within the power budget, resulting in an improvement to the feature performance.

The dynamic power budget management algorithm may be illustrated by the following example. Consider a linear distribution of the remaining power budged based on the fix time T (seconds), e.g., the time required to complete a location determination event. The fix time T may correspond to a power utilization of P (mAh) for the fix. In this illustrative example, T may be set to a constant value of an average fix time, corresponding to average case power consumption per power event. In other examples, the algorithm may utilize the time associated with the worst or best case power consumption per power event values. Additionally, P may be a constant corresponding to the average case power consumption per power event. In other examples, P may be set to one of the best or worst case power consumption per power event values. The algorithm may utilize any of the worst, best, or average values for P and T.

In this example, the algorithm may be set to recalculate the fix frequency distribution after each power event. As noted above, the algorithm may be modified to recalculate after a number of power events, or a hybrid approach where a number of power events to trigger a recalculation decreases as the end of the power budget is reached. Using these conditions and settings, the next fix time is:

$$NFt = BRt/((VMLt/Pavg)+1),$$

where NFt is the number of seconds from recalculation time, and recalculation may be performed after a power event completes, e.g., location data is acquired from a location determination event. BRt is the battery life remaining in seconds, VMLt is the variable managed budget for the location determination feature in mAh, and Pavg is the average power per event or fix in mAh.

In one illustrative example, after a location determination fix, assume BRt is 360 seconds, VMLt is 36 mAh, and Pavg is 4 mAh. Then:

$$NFt = 360/((36/4)+1) = 36.$$

Therefore, the next location determination fix time will be 36 seconds from the time of performing recalculation, which may be performed following the last location determination fix. In this example, 36 seconds after recalculation, a fix is performed.

After every fix, the amount of time and power consumed by the fix may be determined to adjust the BRt and VLMt values, and recalculate accordingly. The new value of BRt, BRt1, may be determined by subtracting from the BRt value at the previous event (e.g., 360), BRt0, the sum of the time to the subsequent fix calculated for the previous event, NFt0, and the fix time (T):

$$BRt1 = BRt0 - (NFt0 + T).$$

Similarly, the new value of VMLt, VMLt1, may be determined by subtracting from the VMLt values at the previous event (e.g., 36), VMLt0, the amount of power P used by the previous fix:

$$VMLt1 = VMLt0 - P$$

Therefore, the next fix time is:

$$NFt1 = BRt1/((VMLt1/Pavg)+1).$$

Assuming the next location determination fix consumes 4 seconds (T) and 8 mAh (P). Then, after this location determination fix, the device updates BRt to (360−(36+4))=320 seconds, and updates VMLt to (36−8)=28 mAh. Then:

$$NFt = 320/((28/4)+1) = 40 \text{ seconds}.$$

As noted above, the example of the location determination feature is merely illustrative, and the techniques of this disclosure may be applied to other variable features in the device. In one example, the modification to the values of BRt and VMLt may depend on the power events associated with other variable managed features. In another example, the power budgets may be apportioned for each variable managed feature and the algorithm may be applied independently to each feature.

In addition to reassessing the power consumption and the frequency of the power events of each of the variable managed features individually, the algorithm may periodically assess the overall power budget for all the variable managed features. The algorithm may periodically determine, based on the remaining power budget for all variable managed features and the prioritization, the amount of power allocated to each of the features. The algorithm may perform the reallocation after at least one power event of one of the variable managed features, after a pre-determined period of time, or if power consumption jitter exceeds a certain threshold, for example. The reallocation of the amount of power to each of the variable managed features may result in redistributing the power budgets among the features, which may account for features consuming power budgets at different rates.

While the techniques of this disclosure are described using the example of GPS-based location determinations and frequency of obtaining GPS data, other types of sensors and techniques may be utilized. For example, the sensor may be an accelerometer, where the frequency of obtaining acceleration measurements of the device may be varied using the techniques of this disclosure. In one example, the algorithm may vary the format of data communicated over a communication channel such that, depending on the resources, more compressed data corresponding to a shorter transmission duration or less compressed data corresponding to a longer transmission duration may be utilized depending on a tradeoff between the length of transmission, the available power budget remaining, and required transmission performance. In this example, different types and amounts of data compression may be utilized. In the case of higher data compression, e.g., lossy compression, there may be more errors and therefore lower quality, but the communication channel may be used for a shorter time than in the case of higher quality and less compressed data. The dynamic feature-aware power budget management algorithm may determine whether to use higher or lower data compression based on an amount of remaining power budget.

Figure 5:
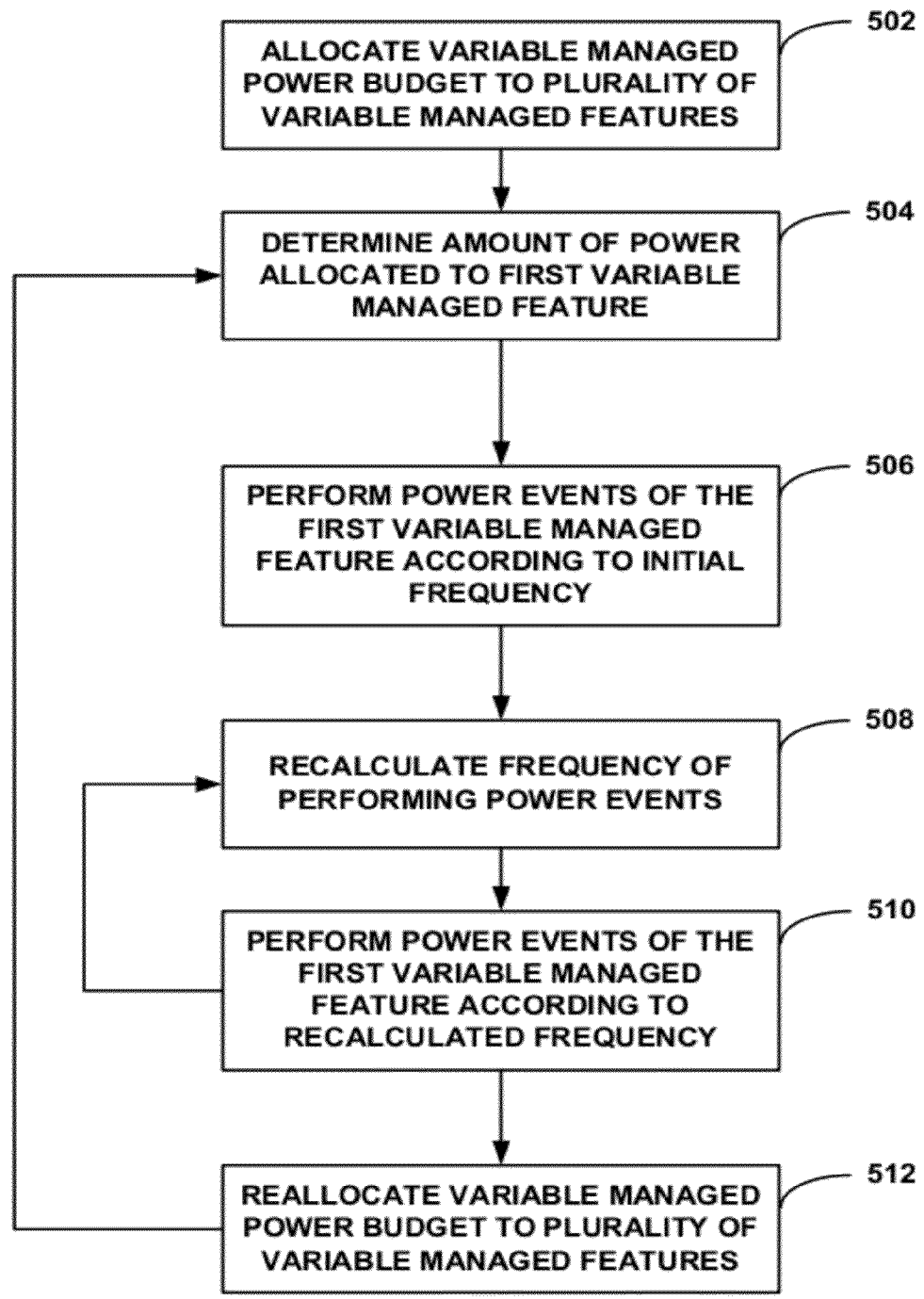
FIG. 5 is a flow chart of an example method of dynamic power budget management in accordance with this disclosure.

FIG. 5 is a flow chart of an example method of dynamic power budget management in accordance with this disclosure. The illustrated example method may be performed by device 100 (FIG. 1). In some examples, a computer-readable storage medium (e.g., memory 104) may store instructions, modules, or algorithms (e.g., power budget management (PBM) module 114) that, when executed, causes one or more processors (e.g., processor 102) to perform one or more of the illustrated steps in the flow chart.

The method of FIG. 5 includes allocating a variable managed power budget to a plurality of variable managed features included in device 100 (502). The amount of power allocated to the variable managed features may depend on the power budget associated with a power source (e.g., battery 110) of device 100. The variable managed features may include one or more features associated with activities that have variable power utilization rates and allow power budget management, e.g., a GPS-based location determination feature or a data transfer feature. Each of the variable managed features may have a priority associated with it. The amount of power allocated to each of the variable managed features may be based on the priority associated with the feature. The method further includes determining the amount of the variable managed power budget allocated to a first one of the variable managed features, e.g., the location determination feature (504).

Each of the variable managed features may perform power events where an activity associated with the feature may occur, causing a certain amount of power to be consumed. For the first variable managed feature, e.g., the location determination feature, one or more power events, e.g., GPS-based location fixes, may be performed according to an initial frequency (506). Each power event may consume an amount of power, which may depend on the duration of the event. The amount of power consumed by performing power events may vary from one event to another according to various conditions, e.g., time needed to complete the power event, environmental condition, and the like.

The method also includes recalculating a frequency with which to perform the power events of the first variable managed feature (508). The frequency of performing the power events for a certain feature may indicate the time between recalculating the frequency and the next time the power event is performed. In one example, the frequency may be recalculated after every power event. In another example, the frequency may be recalculated after performing N power events, where N is constant. In yet another example, the frequency may be recalculated after performing N power events, where N may decrease as the amount of power allocated to the variable managed feature decreases and nears zero.

The recalculation of the frequency with which to perform the power events may be based on the amount of remaining power for the variable managed feature after performing the power events. The amount of remaining power may be based on the difference between the amount of power available at the last recalculation and the amount of power consumed by power events since. After recalculating the frequency of performing the power events for the first variable managed feature, the power events of the first variable managed feature may be performed according to the recalculated frequency (510). The frequency of performing the power events for the variable managed feature may be recalculated (508), as noted above, after every power event, after a certain number of power events, or other criteria.

In one example, the inner cycle of performing power events, recalculating frequency of performing power events, and performing power events at the recalculated frequency may be applied to each of the variable managed features. In addition, the remaining variable managed power budget associated with the variable managed features may be determined and reallocated to the plurality of variable managed features (512). The reallocation of the power to the variable managed features may be based on an amount of remaining variable managed power budget after at least one of a power event of one of the variable managed features, a pre-determined period of time, and a threshold level of power consumption jitter. The reallocation of power to each of the variable managed features may be based on priorities associated with the features.

In one example, the amount of power allocated may be the same as the amount of remaining power. In another example, the amount of power allocated may be determined based on an overall power budget associated with other features, where the power budget may be redistributed among features according to their power consumption. The newly allocation amount of power for the first variable managed feature may again be determined (504), and the power events and frequency recalculation may be performed for the first variable managed feature as described above.

As discussed above, the techniques of this disclosure describe a dynamic power budget management algorithm in a handheld communication device. In some examples, the dynamic power budget management algorithm may operate passively, where it may not have direct control over the behavior of the features it manages. In passive operation, the dynamic power budget management algorithm may respond and adapt to the behavior of the variable managed features in a passive manner. For example, in the GPS-based location determination feature, the quality of the location may be set to allow for up to 30 seconds to perform a fix, meaning, a fix occurs in 30 seconds or less. The dynamic power budget management algorithm may use the actual fix time as input to determine the fix frequency. In this manner, the operation of the algorithm is passive.

In other examples, the dynamic power budget management algorithm may operate in a more active manner. For example, using the same example as above, the GPS-based location determination feature, the default quality of the location may also be set to allow for up to 30 seconds to perform a fix. The dynamic power budget management algorithm may determine, based on certain tradeoff conditions, to increase or decrease this amount of time. For example, it may be more critical that the power source (e.g., battery) lasts 10 hours with lower quality fix, than to last 5 hours with higher quality fix. The algorithm may then lower the quality of location from 30 seconds to 15 seconds, for example, which means a fix will occur in 15 seconds or less. In this example, lowering the quality of location may result in some compromise to the accuracy of the fix, as there will less time to resolve the location, but may result in a tradeoff of extending battery life. In this manner, the operation of the algorithm is active, as it directly controls the operation of the feature.

Using the data transfer over a communication link example, a minimum amount of data compression may be set as default. In a passive operation, the dynamic power budget management algorithm may use the default amount of data compression as input, based on which the adjustment to data compression may be determined. In an active operation, the dynamic power budget management algorithm may alter the default amount of data compression, or the minimum amount of data compression to a higher level of compression. In this way, the accuracy of the transferred data may be compromised more, but results in a tradeoff that extends battery life longer.

In one example, the techniques of this disclosure may be utilized with one or more power events that affect the power budget of a variable managed feature. For example, for a feature that utilizes location determination, a set of location determination methods may be considered by the dynamic power budget management algorithm. For example, the location determination methods may be sensor-based, short range radio based, cellular-based, GPS-based, and the like. In one example, the variable managed feature may utilize a subset of the methods to determine location. During its operation, the dynamic power budget management algorithm may select the method that utilizes the least amount of power in a given situation or under given conditions. For example, in certain geographical regions utilizing a GPS-based method to determine location may consume less battery power than a cellular-based method. In this example, the dynamic power budget management algorithm may select the GPS-based method for location determination as part of its operation to further reduce power consumption.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, a computer-readable storage medium may comprise a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method of managing power consumption in a battery-powered device comprising:
    determining an amount of power allocated to a variable managed feature supported by the device;
    performing one or more power events of the variable managed feature according to a distribution frequency that indicates when to perform the power events, wherein performing each of the power events consumes a variable amount of time and a variable amount of power;
    in response to performing the one or more power events, determining remaining battery life of the device based on the variable amount of time consumed by performing the one or more power events, and determining an amount of remaining power for the variable managed feature based on the variable amount of power consumed by performing the one or more power events; and
    recalculating the distribution frequency that indicates when to perform subsequent power events of the variable managed feature based on the remaining battery life of the device after performing the one or more power events, the amount of remaining power for the variable managed feature after performing the one or more power events, and average power consumption per power event.

2. The method of claim 1, wherein recalculating the distribution frequency comprises recalculating the distribution frequency based on the remaining battery life of the device and the amount of remaining power for the variable managed feature after a first one of the power events, the method further comprising performing a subsequent power event of the variable managed feature according to the recalculated distribution frequency.

3. The method of claim 2, wherein the recalculated distribution frequency comprises an amount of time between recalculating the distribution frequency and performing the subsequent power event of the variable managed feature.

4. The method of claim 1, wherein determining the amount of remaining power for the variable managed feature comprises determining a difference between the amount of power allocated to the variable managed feature and the variable amount of power consumed by performing the one or more power events of the variable managed feature.

5. The method of claim 1, further comprising allocating an amount of power to each of a plurality of variable managed features from a variable managed power budget, wherein the variable managed feature is one of the plurality of variable managed features.

6. The method of claim 5, further comprising reallocating an amount of power to each of the plurality of variable managed features based on an amount of remaining variable managed power budget after at least one of a power event of one of the variable managed features, a pre-determined period of time, or a threshold level of power consumption jitter.

7. The method of claim 1, wherein the variable managed feature comprises a global positioning system (GPS) based location determination feature.

8. The method of claim 1, wherein the variable managed feature comprises a data transfer feature.

9. A non-transitory computer-readable storage medium in a battery-powered device containing instructions, the instructions cause a programmable processor to:
    determine an amount of power allocated to a variable managed feature supported by the device;
    perform one or more power events of the variable managed feature according to a distribution frequency that indicates when to perform the power events, wherein performing each of the power events consumes a variable amount of time and a variable amount of power;
    in response to performing the one or more power events, determine a remaining battery life of the device based on the variable amount of time consumed by performing the one or more power events, and determine an amount of remaining power for the variable managed feature based on the variable amount of power consumed by performing the one or more power events; and
    recalculate the distribution frequency that indicates when to perform subsequent power events of the variable managed feature based on the remaining battery life of the device after performing the one or more power events, the amount of remaining power for the variable managed feature after performing the one or more power events, and average power consumption per power event.

10. The non-transitory computer-readable storage medium of claim 9, wherein the instructions to recalculate the distribution frequency comprise instructions that cause the processor to recalculate the distribution frequency based on the remaining battery life of the device and the amount of remaining power for the variable managed feature after a first one of the power events, the computer-readable medium further comprising instructions that cause the processor to perform a subsequent power event of the variable managed feature according to the recalculated distribution frequency.

11. The non-transitory computer-readable storage medium of claim 10, wherein the recalculated distribution frequency comprises an amount of time between recalculating the distribution frequency and performing the subsequent power event of the variable managed feature.

12. The non-transitory computer-readable storage medium of claim 9, wherein the instructions to determine the amount of remaining power for the variable managed feature comprise instructions that cause the processor to determine a difference between the amount of power allocated to the variable managed feature and the variable amount of power consumed by performing the one or more power events of the variable managed feature.

13. The non-transitory computer-readable storage medium of claim 9, further comprising instructions that cause the processor to allocate an amount of power to each of a plurality of variable managed features from a variable managed power budget, wherein the variable managed feature is one of the plurality of variable managed features.

14. The non-transitory computer-readable storage medium of claim 13, further comprising instructions that cause the processor to reallocate an amount of power to each of the plurality of variable managed features based on an amount of remaining variable managed power budget after at least one of a power event of one of the variable managed features, a pre-determined period of time, or a threshold level of power consumption jitter.

15. The non-transitory computer-readable storage medium of claim 9, wherein the variable managed feature comprises a global positioning system (GPS) based location determination feature.

16. The non-transitory computer-readable storage medium of claim 9, wherein the variable managed feature comprises a data transfer feature.

17. A battery-powered device comprising:
 means for determining an amount of power allocated to a variable managed feature supported by the device;
 means for performing one or more power events of the variable managed feature according to a distribution frequency that indicates when to perform the power events, wherein performing each of the power events consumes a variable amount of time and a variable amount of power;
 means for determining, in response to performing the one or more power events, a remaining battery life of the device based on the variable amount of time consumed by performing the one or more power events, and an amount of remaining power for the variable managed feature based on the variable amount of power consumed by performing the one or more power events; and
 means for recalculating the distribution frequency that indicates when to perform subsequent power events of the variable managed feature based on the remaining battery life of the device after performing the one or more power events, the amount of remaining power for the variable managed feature after performing the one or more power events, and average power consumption per power event.

18. The device of claim 17, wherein the means for recalculating the distribution frequency comprises means for recalculating the distribution frequency based on the remaining battery life of the device and the amount of remaining power for the variable managed feature after a first one of the power events, the device further comprising means for performing a subsequent power event of the variable managed feature according to the recalculated distribution frequency.

19. The device of claim 18, wherein the recalculated distribution frequency comprises an amount of time between recalculating the distribution frequency and performing the subsequent power event of the variable managed feature.

20. The device of claim 17, wherein the means for determining the amount of remaining power for the variable managed feature comprises means for determining a difference between the amount of power allocated to the variable managed feature and the variable amount of power consumed by performing the one or more power events of the variable managed feature.

21. The device of claim 17, further comprising means for allocating an amount of power to each of a plurality of variable managed features from a variable managed power budget, wherein the variable managed feature is one of the plurality of variable managed features.

22. The device of claim 21, further comprising means for reallocating an amount of power to each of the plurality of variable managed features based on an amount of remaining variable managed power budget after at least one of a power event of one of the variable managed features, a pre-determined period of time, or a threshold level of power consumption jitter.

23. The device of claim 17, wherein the variable managed feature comprises a global positioning system (GPS) based location determination feature.

24. The device of claim 17, wherein the variable managed feature comprises a data transfer feature.

25. A battery-powered device comprising:
 a battery; and
 a processor to:
  determine an amount of power from the battery allocated to a variable managed feature supported by the device,
  perform one or more power events of the variable managed feature according to a distribution frequency that indicates when to perform the power events, wherein performing each of the power events consumes a variable amount of time and a variable amount of power,
  determine, in response to performing the one or more power events, a remaining battery life of the battery based on the variable amount of time consumed by performing the one or more power events, and an amount of remaining power for the variable managed feature based on the variable amount of power consumed by performing the one or more power events, and
  recalculate the distribution frequency that indicates how frequently to perform subsequent power events of the variable managed feature based on the remaining battery life of the battery after performing the one or more power events, the amount of remaining power for the variable managed feature after performing the one or more power events, and average power consumption per power event.

26. The device of claim 25, wherein the processor is configured to recalculate the distribution frequency based on the remaining battery life of the battery and the amount of remaining power for the variable managed feature after a first one of the power events, and the processor is further configured to perform a subsequent power event of the variable managed feature according to the recalculated distribution frequency.

27. The device of claim 26, wherein the recalculated distribution frequency comprises an amount of time between recalculating the distribution frequency and performing the subsequent power event of the variable managed feature.

28. The device of claim 25, wherein, to determine the amount of remaining power for the variable managed feature, the processor determines a difference between the amount of power allocated to the variable managed feature and the variable amount of power consumed by performing the one or more power events of the variable managed feature.

29. The device of claim 25, wherein the processor allocates an amount of power to each of a plurality of variable managed features from a variable managed power budget, wherein the variable managed feature is one of the plurality of variable managed features.

30. The device of claim 29, wherein the processor reallocates an amount of power to each of the plurality of variable managed features based on an amount of remaining variable managed power budget after at least one of a power event of one of the variable managed features, a pre-determined period of time, or a threshold level of power consumption jitter.

31. The device of claim 25, wherein the variable managed feature comprises a global positioning system (GPS) based location determination feature.

32. The device of claim 25, wherein the variable managed feature comprises a data transfer feature.

* * * * *